Sept. 20, 1971   W. F. HAHN   3,606,180
BREAKER BAR MOUNTING FOR ROTARY IMPACTOR
Filed Nov. 26, 1969   4 Sheets-Sheet 1

INVENTOR.
William F. Hahn
BY *Paul & Paul*
ATTORNEYS.

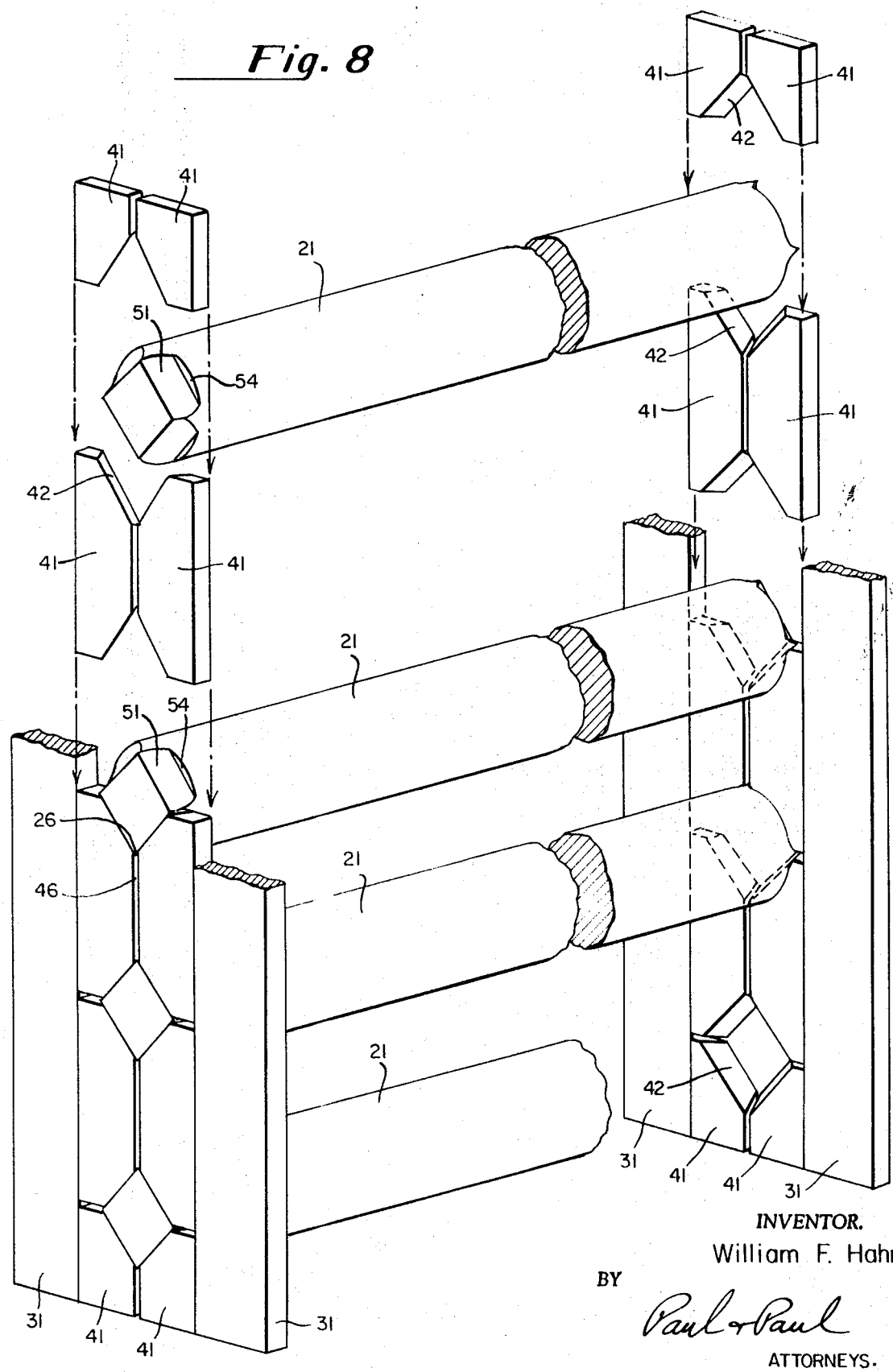

Sept. 20, 1971 W. F. HAHN 3,606,180
BREAKER BAR MOUNTING FOR ROTARY IMPACTOR
Filed Nov. 26, 1969 4 Sheets-Sheet 4

INVENTOR.
William F. Hahn
BY
Paul & Paul
ATTORNEYS.

United States Patent Office 3,606,180
Patented Sept. 20, 1971

3,606,180
BREAKER BAR MOUNTING FOR ROTARY IMPACTOR
William F. Hahn, Devon, Pa., assignor to Pennsylvania Crusher Corporation, Broomall, Pa.
Filed Nov. 26, 1969, Ser. No. 879,983
Int. Cl. B02c 13/26
U.S. Cl. 241—285R                        14 Claims

ABSTRACT OF THE DISCLOSURE

Breaker bars in a rotary impactor are tapered or otherwise shaped at their ends and supported thereat by a wedge-bar assembly located within the frame or housing of the impactor. The ends of the breaker bars do not project through the walls of the housing and there are no exterior supporting brackets and clamps for the wedge bars. The wedge-bar assembly is readily adjustable, and may be readily disassembled to allow removal of one or more of the breaker bars for maintenance and/or replacement.

BACKGROUND OF THE INVENTION

In rotary impact crushers, and particularly in large rotary impact crushers designed to fragment and reduce huge pieces of rock, stone or other material, the breaker bars are subjected to large and repeated impact forces as the rock or other material is thrown at high speed by the rotating hammers against the breaker bars. Due to these very large impact forces, the breaker bars tend to become loose in their supports, and/or to become worn, and/or become bent out of shape, thereby making it necessary to tighten the breaker bar supports or to remove the breaker bars for maintenance, repair, and/or replacement. Heretofore, it has been customary to so mount the breaker bars in the housing that the ends of the bars project through holes in the walls of the housing and are held tightly in place, as by bracket and clamp assembly of some sort located on and bolted to the exterior surface of the housing wall. In such prior art constructions, the repeated pounding and shocks to which the breaker bars are subjected causes the bars to pean over the ends of the shims of the clamping or gripping means, thereby, to reduce what had been a flat clamping surface to a line contact engagement which is totally incapable of holding the breaker bars rigid and firm against movement as they are repeatedly struck by the flying rock or other material. Thus, the bars become loose in their supports.

SUMMARY OF THE INVENTION

The principal object of the present invention is to provide a simple system for holding the breaker bars of a rotary impactor rigid and firm and without loosening, despite the pounding of rock, stone, or other objects thereagainst.

Another object is to provide a breaker bar assembly which can be readily tightened in the event any one or more of the bars tends to loosen.

Another object is to provide a breaker bar assembly which is adjustable as to spacing between adjacent breaker bars, without the employment of shims or other similar means.

Another object is to provide a breaker bar support which allows the breaker bars to be easily repositioned by rotation on their longitudinal axis to compensate for any bending or wear from the pounding of the rock or other material thereagainst.

A further object is to provide supports for breaker bars which are located entirely within the housing of the impactor, and which avoids having the ends of the breaker bar project through holes in the housing walls, thereby facilitating removal of the bars for replacement and/or adjustment and repair.

The foregoing objects (as well as other objects which will be aparent from the description which follows) are achieved in accordance with the present invention by specially preparing the ends, tapered in these illustrations, of the breaker bars and by providing a wedge-bar support system which keeps the ends of the breaker bars tightly wedged relative to the liners and/or the frame and longitudinal axis of the rotor, so that the breaker bars cannot move or rotate under the heavy and repeated impact forces to which they are subjected. Nevertheless, the wedge-bar system is so arranged as to allow for adjustment, and for intentional rotation of each bar on its own axis to a new angular position or orientation, thus obtaining extra wear life from the bars.

In the prior art, wear sleeves of manganese steel customarily surround the cylindrical bars. It is assumed that such wear sleeves may also be used in the breaker bar system of the present invention. In fact, the structural arrangement of the support system of the present invention facilitates removal of the bars, so that removal and replacement of the wear sleeves is also facilitated. This desirable result is obtained, at least in large part, from the fact that the bars are not supported in holes in the housing walls, and therefore do not have to be pulled lengthwise through the housing wall in order to remove the sleeve.

BRIEF DESCRIPTION OF THE DRAWINGS

FIG. 8 is a perspective view, partly exploded, partly broken, showing one of the many ways that breaker bars may be supported in the wedge-bar assembly according to the present invention;

Other methods of achieving wedge-bar results are illustrated in FIGS. 10–15, and others skilled in the art could develop other equivalent arrangements.

DESCRIPTION OF THE PREFERRED EMBODIMENTS

While other bars than breaker bars may be supported by the wedge-bar assembly disclosed herein, it will be convenient to describe the invention as applied to the breaker bar cage of a rotary impactor.

Figure 1:
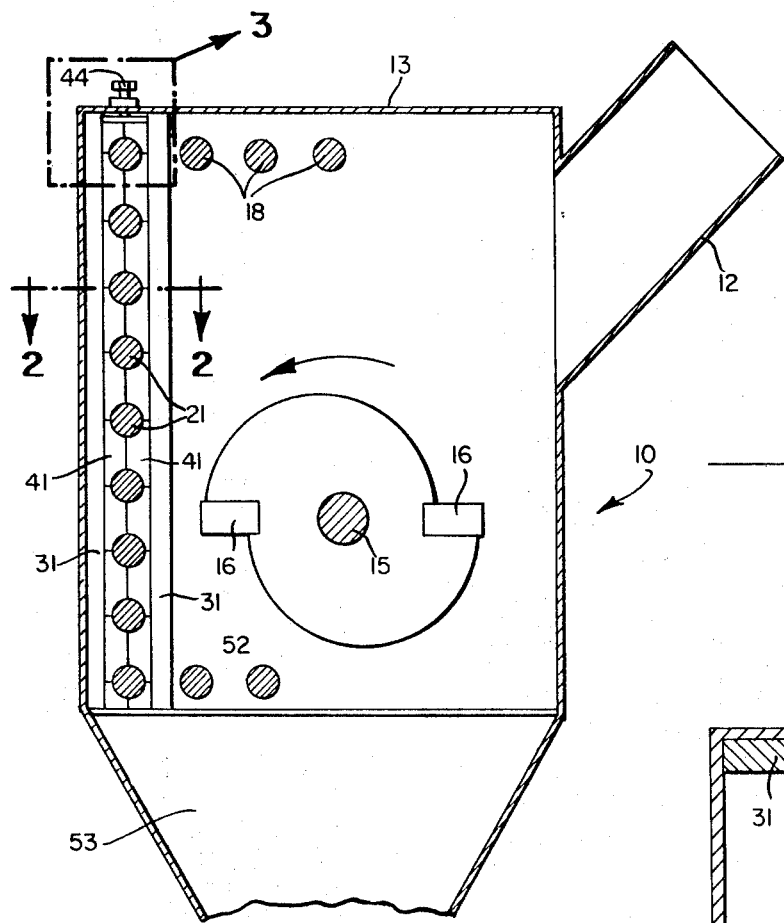
FIG. 1 is a simplified diagrammatic side elevational view of one form of rotary impactor in which breaker bars may be supported by the wedge-bar system of the present invention.
Figure 2:
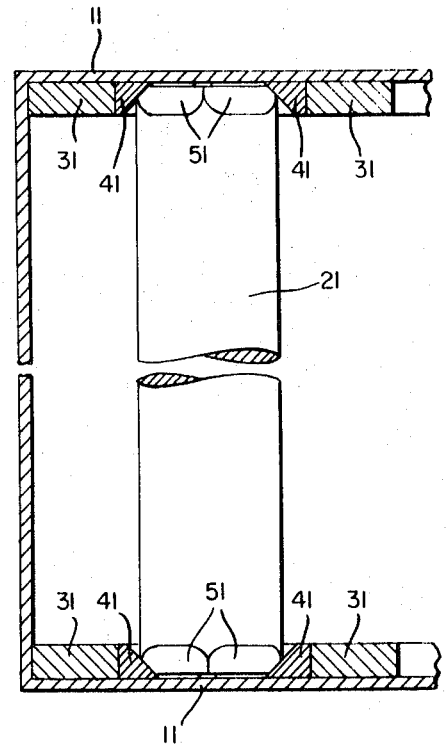
FIG. 2 is an enlarged view, broken, looking down along the line 2—2 of FIG. 1 and showing, for example, tapered ends of the breaker bar supported on the wedge bars.

Referring first to FIG. 1, there is shown diagrammatically in side elevation a rotary hammer impactor having a housing 10, a feed chute 12 through which large pieces of rock, stone, or other material are delivered into the path of the rotating rigid hammers 16 which are mounted on rotor shaft 15 for rotation in the counterclockwise direction, as viewed in FIG. 1. The hammers strike the stone, rock or other material, fragment it, and throw the fragmented pieces at high speed against the breaker bars 18, 21 and 52. Breaker bars 18 extend, generally horizontally, across the housing in the upper part thereof, just below the roof. Breaker bars 52 extend, generally horizontally, across the lower portion or floor of the housing, to one side of the opening through which the fragmented rock and stone is discharged into the hopper 53.

The present invention is directed particularly to means for mounting and supporting the generally vertically-aligned series of breaker bars 21, which form the side of the breaker-bar cage. In accordance with the present invention, a pair of steel liners 31 of rectangular cross-section are bolted or otherwise secured to opposite side walls of the housing 10. The individual liners of each pair are spaced apart by a preselected distance forming a recess or area between the liners, at each side wall of the housing, for receiving the pairs of wedge bars 41 and the tapered ends, in this example, of the breaker bars 21.

As will be described in more detail later, each rectangular, or other suitable configuration, wedge bar has its inward corner severed forming an inclined flat surface 42 (FIG. 9) for receiving one of the inclined flat surfaces 51 of the tapered end of the breaker bar 21. Due to the inclinations of the flat surfaces 42 and 51, any pressure exerted on the inclined surfaces 51 at one end of the breaker bar 21 by the thrust of the wedge bars 41 tends to force the breaker bar 21 to move in its axial direction toward the opposite side wall, thereby to wedge the breaker bar 21 more tightly at said opposite end, with the result that the breaker bars 21 become very tightly held by the wedge bars 41 and do not move or become loose under the heavy and repeated impact force of the flying pieces of rock, stone, etc. Ends of breaker bars, wedge bars, liners, and frames may be so arranged that impact forces on bars are transferred perpendicularly on to the liners through the wedge-bars. This precludes tapered surfaces and requires surfaces parallel to longitudinal axis of the breaker bars.

Figure 4:
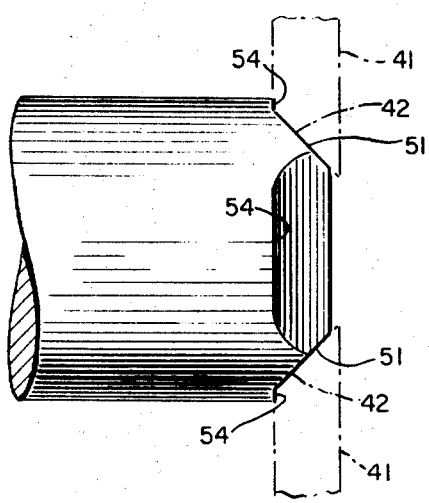
FIG. 4 is a view looking along the line 4—4 of FIG. 3, and showing the tapered end of the breaker bar supported between the tapered ends of lower and upper wedge bars.

The details of the wedge-bar assembly and the manner in which the breaker bars 21 are supported by the assembly are clearly illustrated in the drawing. As already indicated, a pair of steel liners 31, generally of rectangular cross-section, are secured as by bolts or welding to opposite side walls 11 of the housing 10. The individuals liners of each pair are spaced apart by a distance just wide enough to receive therebetween a pair of wedge bars 41, each wedge bar of generally rectangular cross section, with a relatively small space 46 between the wedge bars for receiving one of the apexes 26 of the tapered end of the breaker bar 21. The thickness of the wedge bars 21 is preferably, although not necessarily, equal to that of the liners 21, and somewhat greater than the length axially of the inclined flat faces 21 at the ends of the breaker bars 21, as clearly seen in FIG. 4.

Figure 5:
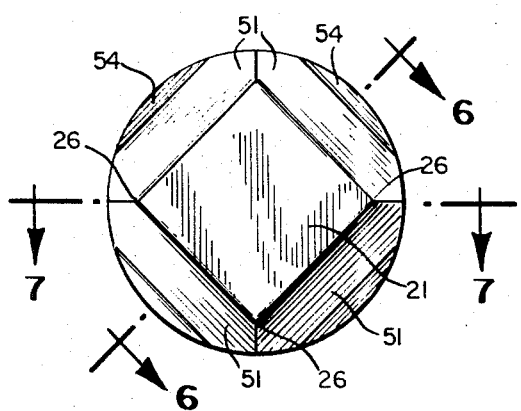
FIG. 5 is an end view of one of the breaker bars.
Figure 6:
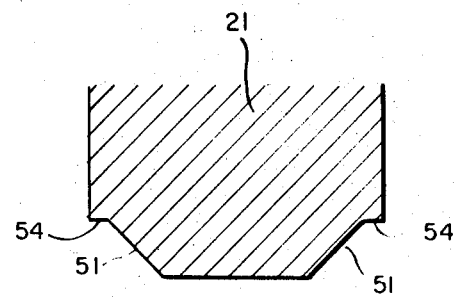
FIG. 6 is a view, in section, looking along the line 6—6 of FIG. 5 and showing the tapered end of the breaker bar.
Figure 7:
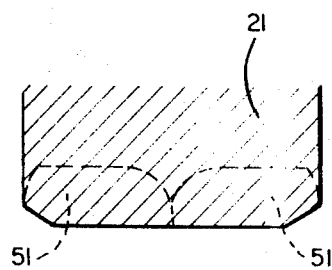
FIG. 7 is a view, in section, looking down along the line 7—7 of FIG. 5 and showing the end of the breaker bar.

The breaker bars 21 are shown as being cylindrical, i.e., as being circular in cross section. While this is the preferred shape, it is not essential insofar as the present invention is concerned, that the bars be of circular cross section. The breaker bars 21 could be of square, or rectangular, or polygonal cross-section. However, a circular cross-section is preferable in that it allows the breaker bars to be equipped, as previously mentioned, with cylindrical sleeves of manganese steel which receive the pounding and impact of the flying rock (or other) fragments and which, when worn, may be replaced. In any event, each end of the breaker bars 21, of whatever cross-sectional configuration, are in accordance with the present invention provided with a plurality of flat surfaces 51, four such surfaces being shown in the drawing. Each of these four surfaces 51 is inclined inwardly toward the end of the bar, as is clearly seen in FIGS. 4 and 5. The angle of inclination relative to the axis of the bar, may be from 0° to 60° range, or even greater, an angle of 45° being shown in the drawing. A shoulder 54, the surface of which is perpendicular to the axis of the breaker bar, is provided at the inward end of the flat inclined face 51. When the breaker bar is tightly fitted into the wedge-bar assembly, the shoulder 54, at least at one end of the breaker bar, tends to abut against the face of the wedge bars.

The inclined flat surfaces 51 at the ends of the breaker bars 21 (four being shown in the illustrated embodiment) form an equal number (four) apexes 26. The breaker bars 21 are so oriented (angularly relative to the longitudinal axis of the bar, that one of the apexes 26 points toward the space 46 between the wedge bars 41. Thus, in the illustrated embodiment, the breaker bar 21 may be adjusted to occupy any one of four positions spaced 90° apart. Such adjustment is used to correct for any axial bending of the breaker bar during service and resulting from heavy and repeated impact against one sector of the cylindrical surface of the breaker bar.

Figure 3:
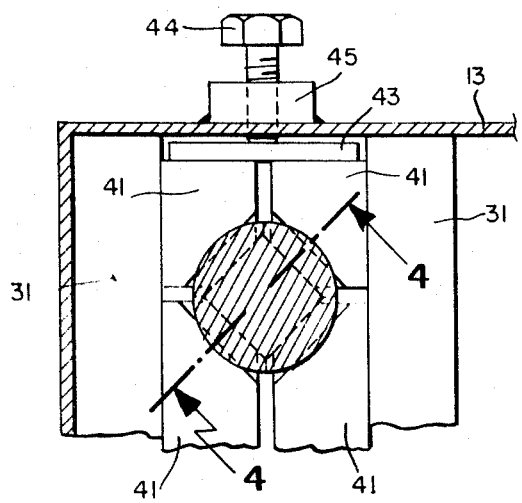
FIG. 3 is a view, in section, looking horizontally into the rectangular area identified by the reference numeral 3 in FIG. 1, and showing, for example, how the tapered end of the breaker bar is held by a lower pair and an upper pair of wedge bars, similarly tapered to match breaker bar ends.
Figure 9:
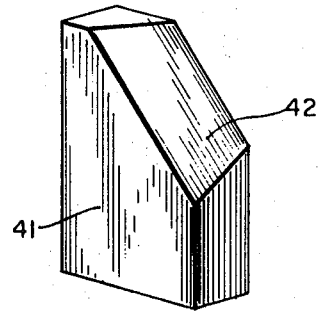
FIG. 9 is a view of the tapered end of one of the wedge bars of FIG. 8.

To hold the ends of the breaker bars 21, the inner corner portion of each wedge bar 41 is provided with a flat surface 42 for mating with one of the inclined flat surfaces 51 of the breaker bars. As seen in FIG. 9, the surface 42 is inclined in two directions which are at right angles to each other. The pair of slightly spaced-apart wedge bars 41 which are below a breaker bar support the weight of the breaker bar (and also the weight of those wedge bars and breaker bars located thereabove), while the pair of wedge bars which are above the breaker bar press down on two of the flat inclined surfaces 51 at the end of the breaker bar due to the weight of the wedge bars and breaker bars located thereabove, and because of the adjustable downward pressure provided by a wedge plate 43 and adjustable screw 44, or other suitable arrangement, shown in FIGS. 1 and 3. The adjustment screw 44 is received within a nut 45 secured, as by welding, to the top plate 13 of the housing 10. It is apparent that downward adjustment of screw 44 increases the pressure of the wedge plate 43 on the entire column of wedge bars 41 and will cause the wedge bars 41 to clamp or squeeze more tightly the tapered ends of the breaker bars 21 thereby tending to force the breaker bars 21 axially toward the opposite side wall, thereby increasing the tightness of the wedge fit at said opposite wall. Thus, the wedge bar assemblies hold the breaker bars 21 firmly and securely against the pounding and impact forces exerted thereagainst.

The provision of tapered ends characterized by four inclined flat surfaces 51 at the ends of the bars 21, and the provision of a wedge-bar assembly comprising four bars 41 each with an inclined surface or face 42 adapted to mate with one of the surfaces 51 for clamping and tightly holding the bar 21 is novel and unique as applied to breaker bars in rotary impactors or other equipment having bars which require rigid clamping. This method or means was designed in connection with the design of a huge primary impactor intended for breaking up large (5′ x 5′ x 5′) blocks of rock or stone as they are taken from the quarry. The breaker bars are about 8 feet long and about 10 inches in diameter. The axial length of the tapered portion, at each end of the breaker bar, is about 2 inches. The height of the shoulder 54 at the center is about ½ inch. The angle of inclination of the flat faces 51 is 45°. The steel liners 31 are about 2 inches thick, The wedge bars 41 are also about 2 inches thick. The width of the wedge bars is dependent upon the diameter of the breaker bar. If the breaker bar has a diameter of 10 inches, each wedge bar would have a width of at least 4½ inches, to allow a one inch separation between wedge bars. The lengths of the wedge bars is dependent upon the spacing desired between breaker bars. This spacing may be altered by merely replacing wedge bars of one length with wedge bars of another length. Steel sleeves may cover the cylindrical breaker bars and take the primary impact and shock.

The dimensions and sizes given above are merely representative of one size of impactor installation and are not intended to be limiting.

The wedge-bar design illustrated and described has a number of advantages. The wedges allow the breaker bars to take the shock of repeated heavy impact without loosening. There are no nuts or bolts, respective to each bar, to become loose. There are no supports outside the housing frame, except the adjusting screws on the top plate. The design is very flexible in allowing adjustment to compensate for wear. The breaker bars can be readily rotated 90°, or 180°, or 270° on the wedge bars to present a new sector to receive the main impacts. The support and clamping action provided by the wedge-bar assembly involves flat surfaces on the wedge bars engaging flat surfaces on the breaker bars so that any peaning resulting from the repeated shocks is a peaning of a flat surface, which is advantageous in comparison with prior art methods. When a sleeve or a breaker bar requires replacement, it is not necessary to pull the breaker bar for its full length through the wall of the housing. Thus, the space requirements outside the machine are substantially reduced by the new design. If desired, the wedge bars may be so cut at the inclined surface or clamping end as to have a sharp point to facilitate cutting through any packed dirt when take-up is required to tighten the assembly.

It will be understood from what has been said hereinabove that the great impact forces imposed on the breaker bars 21 are not absorbed by the wedge bars, but are transmitted through the flat inclined mating surfaces of the breaker and wedge bars to the liners 31 and to the housing walls. The wedge-bar assembly disclosed herein does this without shattering or peaning any side components of the housing or frame.

Figure 10:
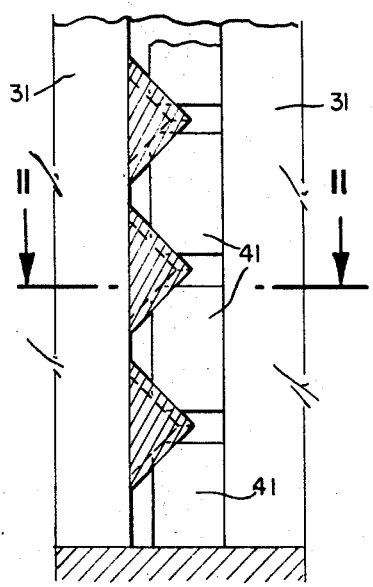
Figure 11:
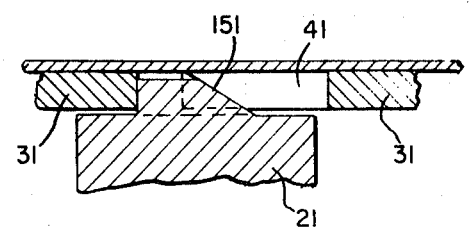
Figure 13:
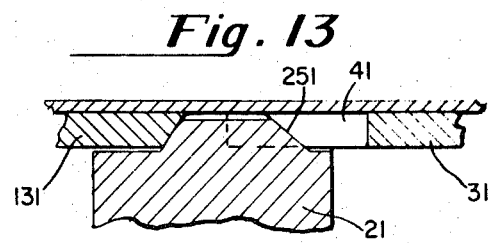
Figure 12:
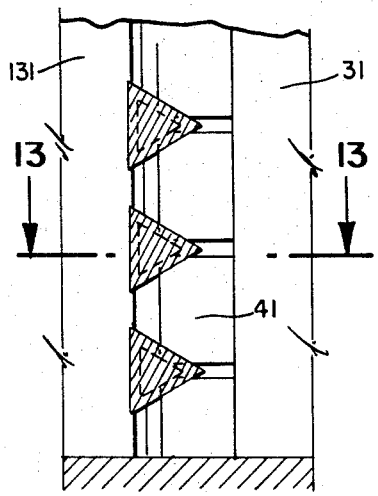
Figure 14:
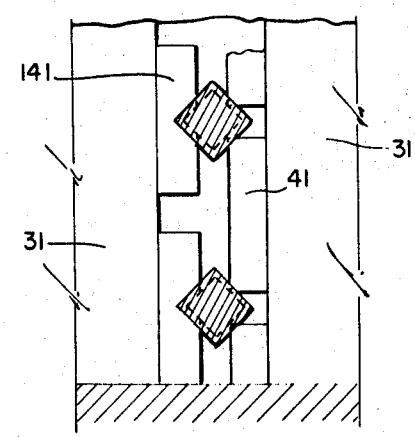
Figure 15:
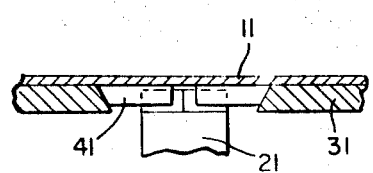

FIGS. 10–15 illustrate several modifications of the wedge bar system. FIGS. 10 and 11 show one modification; FIGS. 12 and 13 show another; FIG. 14 shows yet another; and FIG. 15 shows a further variation.

FIG. 11 is a view in section looking down along the line 11—11 of FIG. 10 while FIG. 13 is a view in section looking down along the line 13—13 of FIG. 12.

In the modification of FIGS. 10 and 11, the ends 151 of the breaker bars 21 are triangular in cross section, and are tapered on two of the three faces of the triangular ends. The third face, which is not tapered, abuts directly against the end of the liner 31. The two tapered faces abut against the tapered ends of the wedge bars 41. Wedge bars are used on only one side of the center axis of the breaker bar.

The modification of FIGS. 12 and 13 is generally similar to that of FIGS. 10 and 11 in that the ends 251 of the breaker bars 21 are triangular in cross section and in that one face of the triangular end abuts directly against the liner 131 and in that wedge bars 41 are used on only one side of the center axis of the breaker bar. However, in the embodiment of FIGS. 12 and 13, all three faces of the ends 251 are tapered. This makes it necessary to incline the end face of the liner 131, as seen in FIG. 13. It should be noted that a breaker bar of the type shown in FIGS. 12 and 13 may be rotated on its own axis to any one of three positions, but that this is not true of the breaker bar of FIGS. 10 and 11.

In the modification of FIG. 14, wedge bars are used on both sides of the center axis of the breaker bar, but the wedge bars 141 on one side of the breaker bar center axis are provided with notches at approximately the center of the end face of the bar, while the wedge bars 41 on the other side are of the same type as in FIGS. 1–13. The vertical spacing between the breaker bars is readily adjustable by merely removing the wedge bars 41 on the other side and replacing them with wedge bars of longer or shorter lengths. The notched wedge bars 141 move up or down (within limits) to accommodate to the lengths of the wedge bars 41.

FIG. 15 illustrates a wedge bar assembly generally similar to that of FIG. 8 modified to the extent that the liners 31 and wedge bars 41 have inclined abutting edges. This modification is used where it is desired to transfer most of the force to the liners 31 rather than to a combination of liners 31 and frame 11.

What is claimed is:

1. In a rotary impactor for fragmenting rock, stone or other material:
   (a) a housing having side walls;
   (b) means at each side wall of said housing forming an elongated generally vertical recess;
   (c) a plurality of breaker bars extending across said housing between said side walls and terminating at each end in said recess;
   (d) said breaker bars being provided with tapered ends, each end characterized by a plurality of flat surfaces disposed angularly about the axis of the breaker bar, forming apexes between said flat surfaces, one of said apexes facing downward,
   (e) a plurality of wedge bars in said recess at each side wall;
   (f) each of said wedge bars being provided with a flat surface so inclined as to abut against one of the flat surfaces at the end of said breaker bar.

2. Apparatus according to claim 1 charatcerized in that each of said flat surfaces on said breaker bars is inclined toward the center axis of the breaker bar.

3. Apparatus according to claim 2 characterized in that said tapered ends of said breaker bar are characterized by four flat surfaces, each inclined.

4. Apparatus according to claim 3 characterized in that means are provided for adjusting the clamping pressure applied by said wedge bars against the ends of said breaker bars.

5. Apparatus according to claim 4 characterized in that said pressure adjusting means comprises a nut secured to the top plate of said impactor above each recess, and adjusting screw in each nut and projecting through said top plate for adjusting the pressure on the wedge bars located at the upper end of said recess.

6. In a rotary impactor:
   (a) a housing having side walls;
   (b) spaced-apart liners secured to opposite side walls of said housing and forming therebetween a recess at each side wall;
   (c) a series of breaker bars extending between said opposite wall recesses, the end portions of said breaker bars being tapered and characterized by a plurality of inclined flat surfaces disposed angularly about the center axis of said breaker bar forming apexes at least one of which faces downwardly;
   (d) wedge support members in each of said recesses, said wedge support members having an inclined flat surface for mating with one of the inclined flat surfaces of the breaker bar.

7. Apparatus according to claim 6 characterized in that each recess includes wedge members on each side of the center axis of the breaker bar.

8. Apparatus according to claim 7 characterized in that each recess includes a pair of wedge members below each of said breaker bars and a pair of wedge members above each of said breaker bars.

9. Apparatus according to claim 6 characterized in that:
   (a) said series of breaker bars are generally vertically aligned, and in that
   (b) the wedge support member above a breaker bar is integral with the wedge support member blow the breaker bar next above.

10. Apparatus according to claim 6 characterized in that:
    (a) the breaker bars are circular in cross-section;

(b) the inclined flat surfaces at the ends of the breaker bars terminate short of the circumference of the breaker bars forming at each inclined flat surface a shoulder adapted to abut against a wedge member.

11. Apparatus according to claim 6 characterized in the provision of:
   (a) adjustable wedge-bar pressure means mounted above each of said recesses and adapted to exert a downward force on the wedge members in said recesses.

12. Apparatus according to claim 6 characterized in that the wedge members are rectangular in cross section having at least one end portion tapered at one corner thereof to form said inclined flat surface which is adapted to mate with one of said inclined flat surfaces of the breaker bar.

13. Apparatus according to claim 12 characterized in that the inclined flat surface at the corner of the wedge member occupies a plane which is inclined in two directions relative to the horizontal, said two directions being orthogonally related to each other.

14. Apparatus according to claim 6 characterized in that the spacings between breaker bars is adjustable according to the lengths selected for the wedge support members.

References Cited

UNITED STATES PATENTS

| | | | |
|---|---|---|---|
| 2,525,795 | 10/1950 | Grisdale, Jr. | 241—285X |
| 3,202,368 | 8/1965 | Nixon | 241—286XR |

GRANVILLE Y. CUSTER, JR., Primary Examiner

U.S. Cl. X.R.

241—189R